United States Patent Office 3,766,283
Patented Oct. 16, 1973

3,766,283
PREPARATION OF NORBORNENES
Nicholas B. Lorette, Lake Jackson, Tex., assignor to The Dow Chemical Company, Midland, Mich.
No Drawing. Filed Mar. 27, 1972, Ser. No. 238,465
Int. Cl. C07c 3/04
U.S. Cl. 260—666 PY     8 Claims

ABSTRACT OF THE DISCLOSURE

Norbornene and alkyl substituted norbornenes are made by continuously condensing olefins such as ethylene, propylene, etc. with dicyclopentadiene or cyclopentadiene in the presence of an inert solvent in a pressurized reactor. Increased yields of the desired norbornenes are obtained by recycling the by-products back to the reactor to react with additional olefins.

BACKGROUND OF THE INVENTION

This invention relates to a process for the preparation of norbornene and alkyl substituted norbornenes by the reaction of lower olefins and cyclopentadiene or dicyclopentadiene in an inert hydrocarbon solvent.

It is known from the U.S. Pat. 3,007,977 to A. B. Hill et al. that norbornylene can be obtained by the reaction of ethylene with impure cyclopentadiene dimers at selected high temperatures and pressures.

However, this process is disadvantageous in that considerable amounts of carbon and resinous material are formed with a slow buildup in the reactor and the associated equipment.

SUMMARY OF THE INVENTION

It now has been discovered that the preparation of norbornenes can be accomplished by reacting lower olefins with cyclopentadiene in the presence of an inert solvent with high selectivity to norbornenes and with reduced carbon or resin formation.

The process of this invention comprises generally the steps of continuously feeding a lower olefin and a solution of dicyclopentadiene in an inert solvent into a reactor with a substantial excess of olefin, maintaining the temperature, pressure, and residence time in the reactor such that formation of norbornenes are favored and recovering norbornenes from the reaction by-products by distillation.

The more limited process steps comprise feeding a lower olefin and a solution of dicyclopentadiene in an inert solvent into a reactor at a mole ratio in the range from about 1:0.5 to about 10:1 of olefin to dicyclopentadiene, maintaining the reactor at a temperature in the range of from 200 to 325° C., a pressure in the range from 100 to 2000 p.s.i.g. with a residence time of from one-fifth to 5 hours of the reactants in the reactor and recovering norbornenes from the reaction products by distillation.

It has also been found that the reaction by-products from the distillation with additional solvent can be recycled to the reactor with additional lower olefin to generate additional norbornenes. The norbornenes produced are useful in that they can be converted into toluene or alkyl benzenes.

DETAILED DESCRIPTION

The process of this invention is achieved by condensing normal lower alpha mono-olefins such as ethylene, propylene, butene-1, pentene-1, hexene-1, with dicyclopentadiene under selected temperatures and pressures to produce norbornene or alkyl substituted norbornenes.

The alpha olefins used in this process are of a commercial grade having a purity greater than about 50% with less than about 15% by weight of a diolefin content, or 50% of alkane content. It is preferred to use a higher purity olefin.

The cyclopentadiene plus dicyclopentadiene used in this invention is readily available as a by-product from the steam cracking of hydrocarbons. A crude $C_5$ cut from the steam cracking of naphtha and hydrocarbon gases containing 20–25% by weight of cyclopentadiene (CPD) plus dicyclopentadiene (DCPD) with the remainder isoprene, piperylene and other $C_5$ hydrocarbons is the normal starting material. Greater or less CPD plus content may be used.

In this invention, dicyclopentadiene was used as a source of cyclopentadiene. It is well known that at temperatures above 180° C., dicyclopentadiene rapidly decomposes to two moles of cyclopentadiene. Cyclopentadiene would work as a feed equally as well as does dicyclopentadiene.

The solvents used in this process are high boiling inert solvents having a boiling point greater than about 100° C. Examples of these are commercial aromatic hydrocarbons such as xylene, diisopropyl benzenes, toluene, ethyl methyl benzenes, trimethyl benzenes, naphtha, and the like.

If desired other high boiling compounds can be used such as ethylene glycol, alkyl ethers, phenyl ethers, and the like. However, the use of hydrocarbon solvents is preferred.

The temperature of the reaction can vary from about 200 to about 325° C. with the preferred range being from about 220 to about 290° C.

The pressure of the reaction can vary from about 100 to about 2000 pounds per square inch gauge with the preferred range being from about 200 to about 1000 p.s.i.g.

The residence time of the reactants in the reactor varies from about one-fifth to 5 hours with the preferred time being from about ⅓ to 2 hours.

The above lower olefins and dicyclopentadiene in an inert solvent are fed into a reactor such that the mole ratio of olefin to dicyclopentadiene is in the range from about 1.0:0.5 to about 4.0:1.0.

The reactor used in this process is not critical provided that the reactor walls are inert to the reaction. Stainless steel is the preferred material.

The following examples are presented solely to illustrate and not limit the invention.

Example 1

A 15.5 weight percent solution of dicyclopentadiene (DCPD, the dimer of cyclopentadiene) in a commercial xylene cut (containing in percent by weight about 17% ortho, 52% meta, and 9.0% para xylene isomers together with about 22.0% ethyl benzene) was pumped into the bottom of a stainless steel reactor 39 inches long having a 1.25 inch outer diameter and filled with ¼" diameter Pyrex balls having about a 340 cubic centimeter void volume.

The reactor was heated to 200° C. and controlled within 5° C. by three separate resistance wire heaters wrapped around the length of reactor.

Ethylene gas was metered to the bottom of the reactor from a pressure cylinder at a rate such that the mol ratio of ethylene to cyclopentadiene was 2.3.

The pressure in the reactor was regulated to 800 pounds per square inch gauge (p.s.i.g.) by adjustments in a regulator downstream from the reactor.

All liquid and gas reactants passed upwardly through the reactor and through the regulator to have the pressure reduced to atmospheric. Substantially all the products except ethylene were condensed in an ice and Dry Ice train and recovered.

The liquid products were then distilled in a 15 plate distillation column to recover norbornene. The results of this example and similar examples using the same procedure are set forth in Table I.

The combined bottoms from the distillation of Examples 23 and 24 were then diluted with additional commercial xylene to obtain a solution of about 15% by weight of distillation bottoms in the xylene, i.e. the feed material in Table II hereinafter. This solution was then fed back to the same reactor operating at 800 p.s.i.g. with excess ethylene being concurrently fed into the bottom thereof. The temperature of the reactor and the residence time was varied as set forth in the four experiments of Table II. The condensed products were distilled as before and analyzed by a gas chromatograph to give the analyses in Table II.

Table II thus shows that an additional yield of norbornene can be obtained by returning the distillation bottoms to the reactor.

Similar results are obtained when using a continuous recycle of the bottoms to the reactor with a blending thereof with fresh feed of DCPD.

Example 27

In a manner similar to the preceding examples, a feed of 27.5% DCPD in the commercial xylene of Examples 1–26 was pumped into the bottom of a 12 inch by one inch O.D. (outside diameter) stainless steel reactor containing no packing, maintained at the temperature and pressure given below.

Propylene was fed into the bottom of the reactor in the given ratio to CPD.

The liquid condensate containing 5-methyl-2-norbornene (MNB) from this reaction was distilled in a similar manner to the foregoing examples. The details and results are summarized in Table III.

The bottoms from the distillation were combined with an excess of propylene and 88 weight percent xylene solvent and recycled in the same reactor under the same conditions. The analysis of the products and feed are given in Table IV.

TABLE III.—PREPARATION OF 5-METHYL-2-NORBORNENE

| Wt. percent DCPD in feed | Molar feed ratio propylene/CPD | T., °C. | P.s.i.g. | Reaction time (hrs.) | Conversion CPD | Mole percent selectivity | |
|---|---|---|---|---|---|---|---|
| | | | | | | MNB | MHHDMN |
| 27.5 | 1.85 | 260 | 800 | 1.1 | 82.2 | 58.5 | 20.31 |

Note.—MNB=5 methyl-norbornene; MHHDMN=7-methyl-heptahydro[1,4,5,8] dimethanonaphthalene.

TABLE I.—PREPARATION OF NORBORNENE FROM ETHYLENE AND DICYCLOPENTADIENE

| Example | Wt. percent DCPD in feed | Feed ratio $C_2$/CPD | T., °C. | P.s.i.g. | Reaction time, hour | Conversion CPD | Percent selectivity | |
|---|---|---|---|---|---|---|---|---|
| | | | | | | | NB | OHDMN |
| 1 | 15.5 | 2.3 | 200 | 800 | 1.9 | 82.1 | 87.5 | 8.7 |
| 2 | 15.5 | 2.3 | 220 | 800 | 1.9 | 95.9 | 85.5 | 9.3 |
| 3 | 15.5 | 2.3 | 220 | 800 | 1.0 | 89.8 | 86.9 | 10.8 |
| 4 | 15.8 | 5.0 | 200 | 600 | 1.9 | 73.9 | 82.1 | 8.5 |
| 5 | 15.8 | 5.0 | 220 | 600 | 1.9 | 93.2 | 81.2 | 11.6 |
| 6 | 15.8 | 5.0 | 240 | 600 | 1.9 | 97.8 | 84.0 | 11.0 |
| 7 | 15.8 | 2.0 | 200 | 600 | 1.9 | 76.6 | 82.2 | 6.5 |
| 8 | 15.8 | 2.0 | 220 | 600 | 1.9 | 94.9 | 82.6 | 12.4 |
| 9 | 15.8 | 2.0 | 240 | 600 | 1.9 | 97.5 | 80.7 | 14.1 |
| 10 | 15.8 | 5.0 | 200 | 400 | 1.9 | 60.7 | 74.3 | 10.9 |
| 11 | 15.8 | 5.0 | 220 | 400 | 1.9 | 85.5 | 75.4 | 14.3 |
| 12 | 15.8 | 5.0 | 240 | 400 | 1.9 | 93.1 | 77.5 | 14.3 |
| 13 | 15.8 | 2.0 | 200 | 400 | 1.9 | 63.0 | 77.2 | 11.8 |
| 14 | 15.8 | 2.0 | 220 | 400 | 1.9 | 88.2 | 70.9 | 17.2 |
| 15 | 15.8 | 2.0 | 240 | 400 | 1.9 | 96.2 | 70.8 | 16.8 |
| 16 | 15.8 | 0.9 | 220 | 400 | 1.9 | 88.3 | 65.4 | 20.2 |
| 17 | 28.3 | 2.0 | 220 | 400 | 1.9 | 84.6 | 63.3 | 22.2 |
| 18 | 28.3 | 2.0 | 220 | 600 | 1.9 | 91.2 | 70.0 | 19.9 |
| 19 | 28.3 | 2.0 | 220 | 800 | 1.9 | 94.4 | 79.6 | 14.9 |
| 20 | 42.4 | 2.0 | 220 | 400 | 1.9 | 81.9 | 57.1 | 23.9 |
| 21 | 42.4 | 2.0 | 220 | 600 | 1.9 | 89.9 | 66.2 | 23.5 |
| 22 | 42.4 | 2.0 | 220 | 800 | 1.9 | 93.4 | 71.7 | 20.7 |
| 23 | 15.1 | 2.2 | 260 | 800 | 0.9 | 98.7 | 86.3 | 9.8 |
| 24 | 15.1 | 1.7 | 260 | 800 | 0.6 | 97.1 | 83.5 | 11.9 |
| 25 | 8.0 | 1.8 | 270 | 800 | 0.4 | 96.4 | 87.5 | 8.5 |
| 26 | 8.0 | 1.7 | 285 | 800 | 0.4 | 97.4 | 89.8 | 7.1 |

Note.—DCPD=dicyclopentadiene; CPD=cyclopentadiene; NB=norbornene; OHDMN=octahydro-[1,4,5,8]-dimethanonaphthalene; $C_2$=ethylene.

TABLE II.—REACTION OF ETHYLENE WITH OHDMN AND OTHER HEAVY BY-PRODUCTS FROM THE REACTION OF ETHYLENE WITH CPD TO PRODUCE NORBORNENE

| Conditions | Weight percent in product | | | |
|---|---|---|---|---|
| | NB | OHDMN | Heavies | DCPD |
| Feed | 0.0 | 9.56 | 4.73 | 0.56 |
| Experiment 1, 220° C., 1 hr. reaction time | 1.03 | 9.13 | NA | NA |
| Experiment 2, 250° C., 2 hr. reaction time | 6.4 | 7.25 | NA | NA |
| Experiment 3, 250° C., 4 hr. reaction time | 11.67 | 3.02 | NA | NA |
| Experiment 4, 264° C., 4 hr. reaction time | 13.71 | 1.73 | 1.4 | 0.1 |

Note.—OHDMN=octahydro-[1,4,5,8]-dimethanonaphthalene; CPD=cyclopentadiene; DCPD=dicyclopentadiene; Heavies=heavy by-products from the reaction of ethylene plus CPD; tentative identification as tricyclopentadiene and "tricyclopentadiene plus ethylene," and several unknowns; NA=no analysis.

TABLE IV.—REACTION OF PROPYLENE WITH 7-METHYL-HEPTAHYDRO-[1,4,5,8]-DIMETHANONAPHTHALENE TO PRODUCE ADDITIONAL 5-METHYL-NORBORNENE

| | Weight percent | | | | |
|---|---|---|---|---|---|
| | MNB | MHHDMN | CPD | DCPD | Heavies |
| Feed [1] | .06 | 4.26 | | 2.21 | 4.47 |
| Product | 5.02 | 1.25 | 0.6 | 0.24 | 3.84 |

NOTE.—MNB=5 methyl-norbornene; MHHDMN=7-methyl-heptahydro-[1,4,5,8]-dimethanonaphthalene; Heavies=tricyclopentadiene, the Diels-Alder reaction product of CPD and MHHDMN, and similar higher boiling condensation products.

Example 28

Following the same procedure and using the same equipment as in Example 7, butene-1 was used in place of propylene and diisopropyl benzene was used as the solvent. The conditions used and the results are set forth in Tables V and VI.

TABLE V.—PREPARATION OF 5-ETHYL-2-NORBORNENE

| Percent DCPD in feed | Molar feed ratio butene-1/CPD | T.,° C. | P.s.i.g. | Reaction time (hours) | Mole percent | | |
|---|---|---|---|---|---|---|---|
| | | | | | Conversion CPD | Percent selectivity | |
| | | | | | | ENB | EHHDMN |
| 20 | 2.2 | 260–270 | 800 | 1.0 | 86.7 | 62.0 | 18.74 |

NOTE.—ENB=5-ethyl-2-norbornene; EHHDMN=7-ethyl-heptahydro-[1,4,5,8]-dimethanonaphthalene.

TABLE VI.—REACTION OF BUTENE-1 WITH 7-ETHYL-HEPTAHYDRO-[1,4,5,8]-DIMETHANONAPHTHALENE TO PRODUCE ADDITIONAL 5-ETHYL-2-NORBORNENE

| | Weight percent | | | | |
|---|---|---|---|---|---|
| | ENB | EHHDMN | CPD | DCPD | Heavies |
| Feed [1] | 0.01 | 3.20 | | 0.55 | 3.43 |
| Product | 3.05 | 1.21 | 0.25 | 0.06 | 2.62 |

[1] 88 wt. percent xylene solvent.

NOTE.—ENB=5 ethyl-norbornene; EHHDMN=7 ethyl-heptahydro-[1,4,5,8]-dimethanonaphthalene; HEAVIES=tricyclopentadiene, the Diels-Alder reaction product of CPD and EHHDMN, and similar higher boiling condensation products.

Example 29

A C-5 distillation cut obtained from the steam pyrolysis of liquified petroleum gas was used as a source of cyclopentadiene and dicyclopentadiene. The C-5 cut was diluted with xylene and the mixture was allowed to react with ethylene in a manner similar to Example 1. The reaction temperature was 240° C., pressure 600 p.s.i.g., and reaction time 4 hours. The results are listed in Table VII. Note that there was an 88% yield of norbornene based on the converted cyclopentadiene and dicyclopentadiene.

TABLE VII.—REACTION OF ETHYLENE WITH CYCLOPENTADIENE IN A MIXTURE OF C-5 HYDROCARBONS

| | Grams | |
|---|---|---|
| | Feed | Product |
| Compound: [1] | | |
| Pentene-1 | 13.0 | 11.2 |
| Isoprene | 17.7 | 3.4 |
| Cyclopentene | 12.5 | 10.9 |
| Trans piperylene | 14.3 | 3.9 |
| Cis piperylene | 9.4 | 7.7 |
| Cyclopentadiene | 5.5 | 0.7 |
| Dicyclopentadiene | 15.7 | 0.0 |
| Norbornene | 0.0 | 25.9 |

[1] All conjugated dienes in the C-5 cut are listed. The stream contained in minor quantities many other C-5 compounds not listed.

What I claim is:

1. A process for the preparation of norbornene or 5-alkyl norbornenes in which the steps comprise
   (1) feeding a normal lower alpha mono olefin having 2–6 carbons and a solution of dicyclopentadiene or cyclopentadiene in an inert solvent having a boiling point greater than about 100° C. into a reactor with a substantial excess of olefin,
   (2) maintaining the temperature, pressure, and residence time in the reactor such that formation of norbornenes are favored,
   (3) recovering norbornene or 5-alkyl norbornenes from the reaction by-products by distillation and
   (4) feeding said by-products in said inert solvent with additional amounts of said lower olefin back to said reactor to generate additional norbornene or 5-alkyl norbornenes.

2. A process for the preparation of norbornene or 5-alkyl norbornenes in which the steps comprise
   (1) feeding a normal lower alpha mono olefin having 2–6 carbons and a solution of dicyclopentadiene in an inert solvent having a boiling point greater than about 100° C. into a reactor at a mole ratio in the range from about 1:0.5 to about 10:1 of olefin to dicyclopentadiene,
   (2) maintaining the reactor at a temperature in the range of from 200–325° C., a pressure in the range of from 100–2000 p.s.i.g. with a residence time of from 1/5 to 5 hours of the reactants in the reactor,
   (3) recovering norbornene or 5-alkyl norbornenes from the reaction by-products by distillation and
   (4) feeding said reaction by-products in said inert solvent with additional amounts of said lower olefin back to said reactor to generate additional norbornene or 5-alkyl norbornenes.

3. The process of claim 2 in which the lower olefin is ethylene.

4. The process of claim 2 in which the lower olefin is propylene.

5. The process of claim 2 in which the lower olefin is butene-1.

6. The process of claim 2 wherein the solvent is an aromatic hydrocarbon solvent.

7. In a process for the preparation of norbornene or 5-alkyl norbornenes by feeding a normal lower alpha mono olefin having 2–6 carbons and dicyclopentadiene into a reactor with a substantial excess of olefin, maintaining the temperature, pressure and residence time in the reactor such that formation of norbornenes are favored, and recovering norbornene or 5-alkyl norbornenes from the reaction by-products by distillation, the improvement which consists of carrying out the reaction in the presence of from 50 to 90% by weight based on the dicyclopentadiene of an inert solvent having a boiling point greater than about 100° C.

8. The process of claim 7 wherein the solvent is an aromatic hydrocarbon solvent.

References Cited

UNITED STATES PATENTS

| 3,007,977 | 11/1961 | Hill et al. | 260—666 PY |
| 3,427,360 | 2/1969 | Makowski | 260—666 PY |

DELBERT E. GANTZ, Primary Examiner

V. O'KEEFE, Assistant Examiner

U.S. Cl. X.R.

260—666 A